July 3, 1956
J. E. NAUTA
2,753,122
LOAD-REGULATING DEVICE FOR A MILL
OR SIMILAR GRINDING MACHINE
Filed Sept. 16, 1952
2 Sheets-Sheet 2
FIG:2
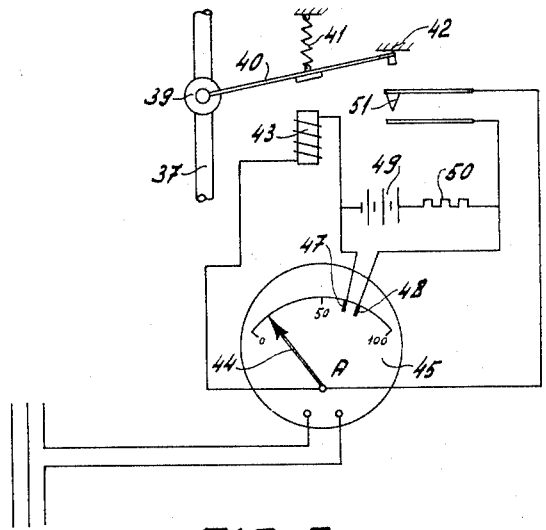
FIG:3
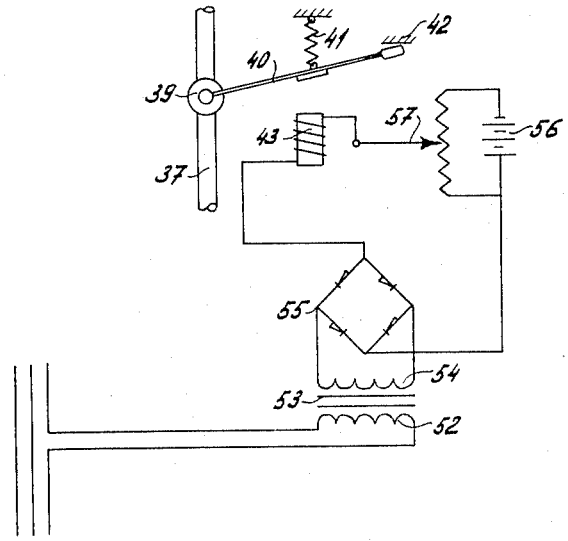
INVENTOR.
JOHANNES EWARDUS NAUTA
BY Haseltine, Lake + Co.
AGENTS

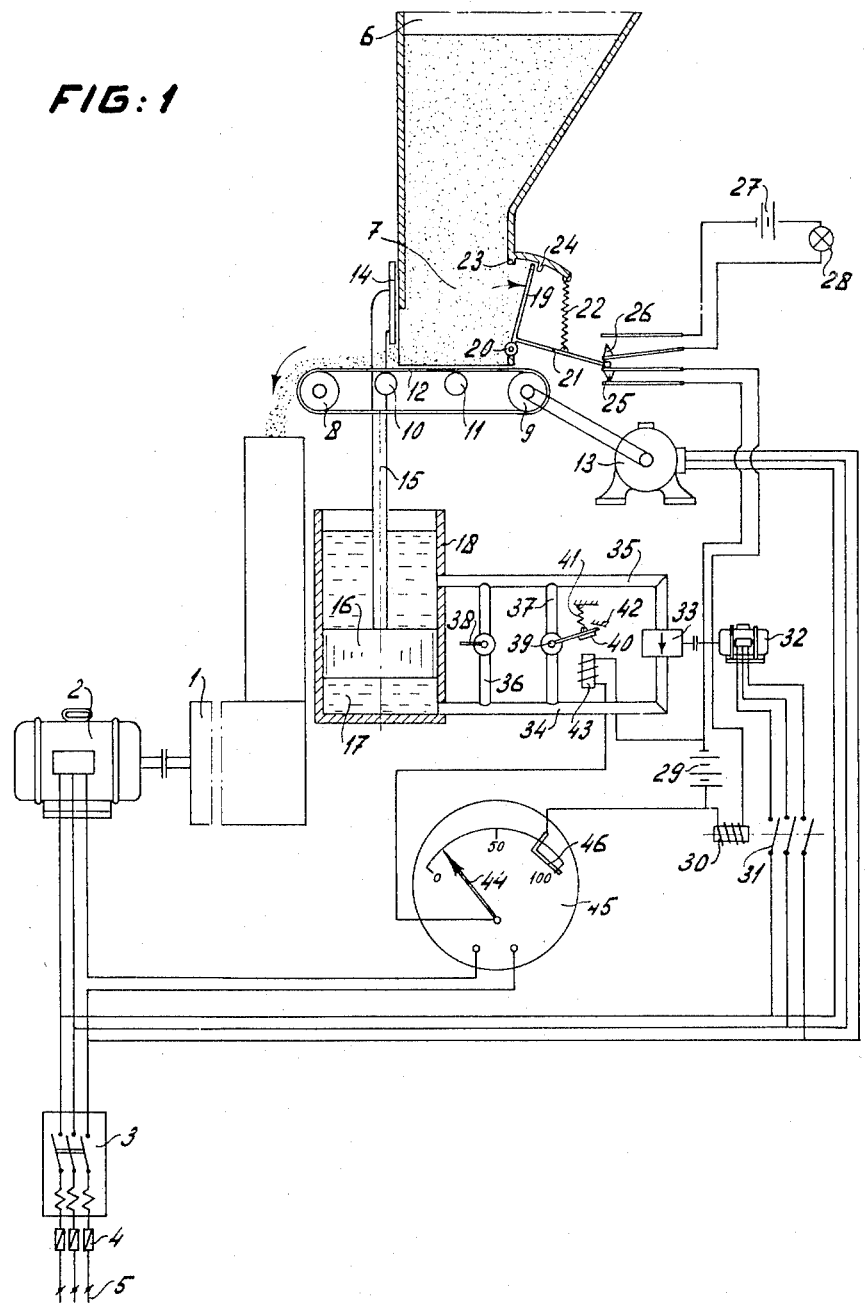

United States Patent Office 2,753,122
Patented July 3, 1956

2,753,122

LOAD-REGULATING DEVICE FOR A MILL OR SIMILAR GRINDING MACHINE

Johannes Ewardus Nauta, Overveen, Netherlands

Application September 16, 1952, Serial No. 309,851

Claims priority, application Netherlands September 18, 1951

2 Claims. (Cl. 241—35)

This invention relates to a load-regulating device for power driven machines and more specifically to an automatically regulated apparatus of the kind comprising in combination a mill or similar grinding machine operating on material fed thereto, an electric drive motor for said machine, a device directly responsive to the load on said drive motor and variable feeding means determining the quantity of material fed to said machine and controlled by said load-responsive device so as to increase said quantity of material as the load on the drive motor decreases, and conversely.

In known apparatus of this kind the load-responsive device acts immediately upon the feeding means, so that the desired and predetermined load on the drive motor, which can only exactly correspond with a definite position or condition of the feeding means for a given kind of material, can be maintained at its exact value, only when this kind of material is fed to the mill or grinding apparatus. If the nature of the material changes, the load on the drive motor will change accordingly and although the load-responsive device will affect the position or condition of the feeding means to change the output thereof, the load on the drive motor can never reach exactly its original value due to the changed position or condition of the feeding means.

The general object of this invention is to obviate the above mentioned drawbacks and to provide a load-regulating device which is independent on the nature of the material fed to the machine and which is adapted to regulate the load on the drive motor more exactly under varying conditions.

According to the invention this object is attained by interposing between the load-responsive device and the variable feeding means a servo-mechanism operating continuously in the same sense as long as a predetermined load on the drive motor has not been exactly reached. Thus the predetermined load on the drive motor can correspond with different positions or conditions of the feeding means according to different natures of the material fed to the machine.

A further object of the invention is to make the said servo-mechanism hydraulically operate.

A still further object of the present invention is to provide a liquid pump delivering liquid into a chamber of varying capacity defined by a movable member connected to the feeding means.

Other objects, features and details of the present invention will become evident from the following description with reference to the accompanying drawings, in which some embodiments of an apparatus according to the invention have been shown by way of example and in which:

Fig. 1 is a diagrammatic view of the complete apparatus, including the grinding machine, the feeding means, the load-responsive device and the servo-mechanism, Figs. 2 and 3 show two alternative embodiments of some parts of the load-responsive device and the servo-mechanism.

Referring to Fig. 1, the grinding machine 1, such as e. g. a hammer mill, is driven by an electric motor 2 which, after cutting in a switch 3, is energized through safety fuses 4 from the three phase current network 5. The switch 3 is of the kind which cuts out if the currents exceed a definite value. The material to be ground is fed to the mill 1 from a hopper or container 6, of which the narrower lower part 7 is closed from below by a conveyor belt 12 passing along rollers 8 and 9 and supported by rollers 10 and 11. The conveyor belt 12 is driven through the roller 9 by means of an electric motor 13 which is also energized through the switch 3. The belt 12 is driven in such direction that the material is fed from the container 6 to the mill 1. A slide 14 is provided at the lower part 7 of the container, said slide being connected by an operating rod 15 to a piston 16 arranged within a cylinder 18. By the supply or withdrawal of liquid to or from the liquid chamber 17 below the piston 16, the operating rod 15 may be moved upwards or downwards, so as to increase or decrease the size of the opening of the container controlled by the slide 14. The position of said slide determines the thickness of the layer of material supplied by the belt 12 to the hammer mill 1 and, since the speed of the belt is substantially invariable, said position of the slide 14 defines at the same time the feeding speed of the material. The wall portion 19 of the container 6, 7, which is opposite to the slide 14, is rotatably mounted on a shaft 20. If said wall portion swings outwardly, the arm 21 connected thereto moves downwardly so as to put a spring 22 under tension. The movement of the wall portion 19 is limited by two stop members 23 and 24. If the wall portion 19 abuts against the stop member 24, the arm 21 closes a contact 25, whereas another contact 26 is opened. In the other extreme position with the wall portion 19 abutting against the stop member 23, however, the contact 25 is opened and the contact 26 closed, so that a source of current 27 will light up a signal lamp 28. This will only happen, when a very small quantity of material is available in the container, since otherwise the pressure of the material against the wall portion 19 will be sufficient to overcome the tension of the spring 22 and to push said wall portion against the stop member 24.

As long as the contact 25 is closed, a source of current 29 will energize a relay 30, by which contacts 31 are closed, so that a motor 32 supplied through said contacts and driving a liquid pump 33 will run simultaneously with the motors 2 and 13 for the hammer mill 1 and for the conveyor belt 12, respectively. If, however, the container 6, 7 is insufficiently filled with material, the switching on of the motors 2 and 13 will not cause the cutting in of the motor 32.

The delivery pipe 34 of the pump 33 is connected to the chamber 17, whereas the suction pipe 35 is connected to the room within the cylinder 18 situated above the piston 16. The output of the pump 33 is, however, not always and never completely supplied to the chamber 17, since the pipes 34 and 35 are interconnected by by-pass pipes 36 and 37 in which members 38 and 39 having an adjustable passage are provided. The passage of the member 38 has a fixed value, whereas that of the member 39 varies between two extreme values. The smallest value prevails as long as the actuating arm 40 abuts against a stop member 42 under the influence of the tension of a draw-spring 41. The largest value prevails, as soon as a coil 43 is sufficiently energized to draw the actuating arm 40 against its armature in opposition to the tension of the spring 41. This will occur, when the pointer 44 of an ammeter 45, disposed in the supply circuit of the motor 2 of the hammer mill, makes contact with the insulated contact strip 46, since the source of current 29 will then be in a position to energize the coil 43 through said contact.

The fixed value for the passage 38 and the two extreme values for the passage 39 are so chosen with regard to the output of the pump 33 that, when the passage 39 has its smallest value, the pump 33, at the given weight of the piston 16 and the slide 14, will still deliver liquid into the chamber 17 in spite of the flow away of liquid through the by-pass lines 36 and 37, so that the piston 16 and the slide 14 will be gradually raised. This will be the case, when the motor 2 has not yet been loaded to such an extent that the pointer 44 of the ammeter 45 makes contact with the strip 46. The upward movement of the slide will cause a gradual increase of the feed of material to be ground, so that the load of the motor 2 will gradually increase and the pointer 44 will continue to deviate. As soon as the pointer 44 comes into contact with the strip 46, the passage of the member 39 is brought to its larger value. This value has been so determined that under the given circumstances the discharge of liquid into the chamber 17 will be less than the quantity of liquid flowing through the pipes 36 and 37. By its weight and if necessary under the influence of a spring the piston 16 will lower again; the supply of material to the hammer mill will gradually decrease, so that finally the load of the motor 2 will reach a value at which the pointer 44 is just still in contact with the strip 46. The load on the motor 2 will thus remain oscillating about the last mentioned value; the extent of oscillating can be kept small by suitably dimensioning and defining the surface area of the piston 16, the passages 38 and 39, the pump 33 and the speed and width of the conveyor belt 12. The average value of the load may be adjusted by displacing the strip 46 along the scale of the meter.

For the pump 33 it will be generally advantageous to choose a pump of the kind having a substantially constant output. The variation of the passage 39 may be further arranged in such a manner that, when said passage is changed, the direction of the liquid flow in the parts of the pipes 34 and 35 situated between the pipes 36 and 37 is reversed. However, such arrangement is not necessary and when the direction of the liquid flow is only reversed in those parts of the pipes 34 and 35 that are situated between the cylinder 16 and the pipe 36, the assembly of the pump 33 and the pipe 37 with variable passage may be also considered as a pump with a variable output. It will be evident that such a pump could be performed also in various other manners.

It is not necessary that the switching over of the member 39 from small to large passage is effected at the same load on the motor 2 as the switching over in the reverse sense. Switching over at two different loads may be, for instance, obtained by controlling the actuating arm 40 of the member 39 in the manner illustrated in Fig. 2. In this arrangement the ammeter 45 is provided with two contact points 47 and 48 so located as to correspond with the two unequal loads. If at an increasing load the pointer 44 comes into contact with the adjustable point 47, nothing particular will happen. When making contact with the likewise adjustable point 48, the coil 43 is, however, energized by the source of current 49 through the resistance 50, so that the arm 40 is switched over and causes the closure of a contact 51. Consequently the coil 43 will remain energized through this contact 51, even if the pointer 44 would interrupt its contact. If, however, the load on the motor 2 decreases to such an extent that the pointer contacts the point 47, the coil 43 will be short-circuited and the arm 40 will be drawn again towards its stop member 42, so as to interrupt the contact 51, and consequently the coil 43 remains unenergized, even if the pointer 44 leaves the contact point 47.

Another embodiment of the device for controlling the arm 40 has been illustrated in Fig. 3. Through the primary winding 52 of a transformer 53 flows the supply current of the motor 2, so that in the secondary winding 54 a voltage is produced which is about proportional to the load on said motor. By means of the rectifier connection 55 a direct current voltage is derived therefrom, which is also substantially proportional to said load. The coil 43 is put in circuit with this voltage; however, in this circuit an adjustable counter-voltage is provided which is formed by a source of direct current 56 including a potentiometer 57. Since the rectifier connection 55 permits the flow of a current in the circuit of the coil 43 only in one direction, no current will flow as long as the direct current voltage derived from the motor current is smaller than the counter voltage. If, however, the first mentioned voltage becomes larger than the counter voltage, the current in coil 43 will soon be sufficient to switch over the arm 40. The load on the motor 2, at which this happens, may be adjusted at will by displacing the variable point of the potentiometer 57.

If, due to the absence of sufficient material in the container 6, 7, the load on the motor 2 would be very small and consequently the slide 14 would be gradually raised to open the discharge opening of the container further and further, a supply of new material to said container would cause a suddenly strong overloading of the hammer mill 1, which is prevented by the fact that, as has been already mentioned above, the wall portion 19 of the container will be swung towards the inner stop member 23, so as to cut out the pump motor 32 by the switch 31. The arrangement of the movable wall portion 19 may, however, be dispensed with, since it is also possible to keep the pump 33 always running and to energize the coil 43 in the absence of sufficient material in the container, e. g. by connecting a contact corresponding to the contact 26 in parallel to the contact between the pointer 44 and the strip 46.

In the embodiment shown the supply of material to the hammer mill is controlled by the slide 14, whilst the speed of the belt 12 is kept constant, so that the variations in the feeding are due to the variable thickness of the layer of material resting upon the belt. However, the construction may be such that the movements of the rod 15 affect the speed of the belt 12, in which case the slide 14 may be fixed in a definite position or may be dispensed with.

It will be evident that in stead of the conveyor belt any other conveying or supplying means may be used, such as a conveyor screw, a vibrator or the like.

What I claim is:

1. In a grinding plant; the combination of a hopper for containing granular material to be ground; a hammermill for grinding the granular material; a first electric motor for driving said hammermill; a source of electric current; first electrical conducting means for supplying current from said source to said first motor; conveying means operative to convey granular material in a continuous stream from said hopper to said hammermill; first control means for controlling the rate at which said conveying means carries the granular material and including a liquid chamber, said rate being high if much liquid is present in said chamber and said rate being low if little fluid is present in said chamber; means for varying the flow of control liquid into and out of said liquid chamber comprising a pump driven by a second electric motor, second electrical conducting means for supplying current from said source of electric current to said second electric motor, a liquid container, conduits leading from the intake and output of said pump to said liquid container and to said liquid chamber, respectively, by-pass means between said conduits, and second control means operative to control the flow of control liquid into and out of said liquid chamber, said second control means including means connected to said first electrical conducting means and operative to measure the load of said first motor, and means responding to said measuring means to vary the flow of control fluid into and out of said liquid chamber in the direction corresponding to an increased conveying rate of said conveying means so long as the load of said first motor is less than a predetermined value and in the direction corresponding to a decreased conveying rate whenever the load of said first motor exceeds a predetermined value; energized and closed relay means interposed in said second electrical conducting means to control the energization of said second motor and means acting in response to the depletion of the granular material in said hopper below a predetermined level to de-energize and open said relay means and thereby to render said pump inoperative so that the flow of control liquid into and out of said liquid chamber is then varied in the direction corresponding to a decrease in the rate at which said conveying means carries the granular material.

2. In a grinding plant; the combination according to claim 1; wherein said means acting in response to depletion of the granular material in said hopper includes a swingable member in the side of said hopper adjacent the bottom of the latter, means yieldably urging said swingable member to a relatively inwardly disposed position, said swingable member, by reason of the weight of the granular material thereagainst, normally occupying a relatively outwardly disposed position, an electrical circuit for energizing said relay means and having cooperating contacts interposed therein, said contacts being biased apart and means controlled by said swingable member to urge said contacts together when said swingable member is in said outwardly disposed position and to free said contacts for separation when said swingable member is yieldably displaced to said inwardly disposed position by reduction in the weight of the granular material acting thereagainst.

References Cited in the file of this patent

UNITED STATES PATENTS

| 294,418 | Wegmann | Mar. 4, 1884 |
| 1,442,042 | Boddie | Jan. 16, 1923 |
| 1,450,720 | Gossman | Apr. 31, 1923 |
| 1,905,766 | Thompson | Apr. 25, 1933 |
| 2,545,260 | Cole | Mar. 13, 1951 |

FOREIGN PATENTS

| 228,789 | Great Britain | Feb. 12, 1925 |